(12) United States Patent
Drenkard et al.

(10) Patent No.: US 8,973,115 B2
(45) Date of Patent: Mar. 3, 2015

(54) SYSTEM AND METHOD FOR ASSEMBLING AND ANALYZING A CANDIDATE APPLICATION FOR A CREDENTIAL

(71) Applicants: Karen Neil Drenkard, Fairfax, VA (US); Ellen Swartwout, Woodbridge, VA (US); Marianne Horahan, Silver Spring, MD (US); Nancy Jo Robert, Washington, DC (US); David Paulson, Rockville, MD (US); Vicki Ann Lundmark, Washington, DC (US); Patricia Rose Deyo, Fairfax, VA (US); Stephanie Lida Ferguson, Amherst, VA (US); Diane Lynn Thompkins, Glenarden, MD (US); Christine Depascale, Gaithersburg, MD (US)

(72) Inventors: Karen Neil Drenkard, Fairfax, VA (US); Ellen Swartwout, Woodbridge, VA (US); Marianne Horahan, Silver Spring, MD (US); Nancy Jo Robert, Washington, DC (US); David Paulson, Rockville, MD (US); Vicki Ann Lundmark, Washington, DC (US); Patricia Rose Deyo, Fairfax, VA (US); Stephanie Lida Ferguson, Amherst, VA (US); Diane Lynn Thompkins, Glenarden, MD (US); Christine Depascale, Gaithersburg, MD (US)

(73) Assignee: American Nurses Credentialing Center, Silver Spring, MD (US)

( * ) Notice: Subject to any disclaimer, the term of this patent is extended or adjusted under 35 U.S.C. 154(b) by 108 days.

(21) Appl. No.: 13/644,571

(22) Filed: Oct. 4, 2012

(65) Prior Publication Data
US 2014/0101735 A1 Apr. 10, 2014

(51) Int. Cl.
*G06F 21/00* (2013.01)

(52) U.S. Cl.
USPC .............................................................. 726/6

(58) Field of Classification Search
CPC ... H04L 63/0815; H04L 63/102; H04L 63/08; G06F 21/31
USPC .............................................................. 726/6
See application file for complete search history.

(56) References Cited

U.S. PATENT DOCUMENTS

| | | | |
|---|---|---|---|
| 5,706,502 | A | 1/1998 | Foley et al. |
| 6,092,081 | A | 7/2000 | Alpert et al. |
| 6,405,226 | B1 | 6/2002 | Alpert et al. |
| 7,606,778 | B2 | 10/2009 | Dewar |
| 7,917,417 | B2 | 3/2011 | Dion |
| 2002/0007290 | A1* | 1/2002 | Gottlieb .......................... 705/4 |
| 2002/0040309 | A1 | 4/2002 | Powers et al. |
| 2002/0194100 | A1 | 12/2002 | Choban et al. |
| 2003/0149594 | A1* | 8/2003 | Beazley et al. ................ 705/2 |
| 2003/0233242 | A1 | 12/2003 | Wenger |
| 2004/0143489 | A1 | 7/2004 | Garman |

(Continued)

OTHER PUBLICATIONS

International Search Report and Written Opinion as issued for International Application No. PCT/US2013/063221, dated Apr. 21, 2014.

*Primary Examiner* — Kambiz Zand
*Assistant Examiner* — Aubrey Wyszynski
(74) *Attorney, Agent, or Firm* — Pillsbury Winthrop Shaw Pittman LLP

(57) ABSTRACT

An automated system and method for assembling and analyzing a candidate application to determine a type of credential in a professional credentialing area for the candidate is provided. The automated system may facilitate the receipt of application materials from various sources and may enable review and appraisal of the application by multiple parties. The application may be tailored to a specific type of requested credential.

44 Claims, 10 Drawing Sheets

(56) References Cited

U.S. PATENT DOCUMENTS

| | | |
|---|---|---|
| 2005/0108030 A1 | 5/2005 | Kim |
| 2005/0278187 A1 | 12/2005 | Bobbitt |
| 2006/0271421 A1 | 11/2006 | Steneker et al. |
| 2006/0277056 A1 | 12/2006 | Broberg |
| 2007/0282904 A1 | 12/2007 | Mitchell |
| 2008/0059292 A1 | 3/2008 | Myers et al. |
| 2008/0320572 A1 | 12/2008 | Connell, II et al. |
| 2009/0106071 A1 | 4/2009 | Mark |
| 2009/0228297 A1 | 9/2009 | McGovern et al. |
| 2009/0228323 A1 | 9/2009 | Ebrahimian |
| 2010/0010880 A1 | 1/2010 | Toth et al. |
| 2010/0100408 A1 | 4/2010 | Dion |
| 2010/0125475 A1 | 5/2010 | Twyman |
| 2010/0131282 A1 | 5/2010 | Rowe et al. |
| 2010/0191556 A1 | 7/2010 | Kalscheuer |
| 2010/0250301 A1 | 9/2010 | Collard |
| 2011/0060695 A1 | 3/2011 | Boyland |
| 2011/0213722 A1 | 9/2011 | Carson et al. |
| 2011/0270627 A1 | 11/2011 | Martin et al. |
| 2012/0041889 A1 | 2/2012 | Morrison et al. |
| 2012/0150763 A1* | 6/2012 | Andino et al. ............... 705/327 |
| 2012/0197813 A1 | 8/2012 | Kurtzig et al. |

\* cited by examiner

SYSTEM AND METHOD FOR ASSEMBLING AND ANALYZING A CANDIDATE APPLICATION FOR A CREDENTIAL

FIELD

The invention relates to a system and method for assembling and analyzing a candidate application to determine a type of credential in a professional credentialing area for the candidate.

BACKGROUND

Generally speaking, an application process may involve numerous entities, including, for example, an applicant, a reviewer, one or more recommenders, an entity from which the applicant is requesting a credential and/or access, and other involved parties. An applicant often has to provide information to the institution. This information was typically gathered by the applicant from various sources and sent to the institution and/or reviewers in paper form, along with an extensive application filled out by the applicant. The applicant would then wait for an extended period of time, often with no information as to the pendency of his application other than an acknowledgement of its receipt.

Conventional systems for automating an application process do not address these issues. For example, a conventional application data entry system may allow an applicant to fill out forms, attach electronic files, and prepare a final application for consideration. This final application, however, may often be the only product and/or result of the conventional system. Typically, the form and content of the final application is fixed. Further, the analysis of the application's merit may be done separately from the data entry system. A conventional system may also fail to allow direct input from persons other than the applicant.

Conventional systems for automating the application suffer from these and other drawbacks.

SUMMARY

Aspects of the present invention relate to an automated system and method for assembling and analyzing a candidate application to determine a type of credential in a professional credentialing area for the candidate. The automated system may facilitate the receipt of application materials from various sources and may enable review and appraisal of the application by multiple parties. The application may be tailored to one or more specific types of requested credentials.

According to an aspect of the present invention, there is provided a computing device for assembling and analyzing a candidate application to determine a type of credential in a professional credentialing area. The computing device may comprise an application registration module configured to allow the candidate to apply for a first type of credential in a first professional credentialing area; an eligibility determination module configured to determine eligibility requirements for the application based on the type of credential, facilitate access, for the candidate, to the eligibility requirements, and receive eligibility inputs based on the eligibility requirements of the application; an evidence determination module configured to determine evidentiary requirements for the application based on the type of credential, facilitate access to the evidentiary requirements, and receive evidentiary inputs based on the evidentiary requirements of the application; an evaluation module configured to determine whether the application is ready for appraisal based on the eligibility inputs and the evidentiary inputs received; an appraisal module configured to provide, when the application is ready for appraisal, the first type of credential to the candidate based on at least a first appraisal of the eligibility inputs and evidentiary inputs received and a second appraisal of the eligibility inputs and evidentiary inputs received; and a storage module configured to store the application.

According to an aspect of the invention, there is provided a method for assembling and analyzing a candidate application to determine a type of credential in a professional credentialing area. The method may be implemented in a computer system comprising one or more processors configured to execute computer program modules. The method may comprise receiving, from a candidate, an application for a first type of credential in a first professional credentialing area; determining, by an eligibility determination module, eligibility requirements for the application based on the type of credential; facilitating, by the eligibility determination module, access, for the candidate, to the eligibility requirements; receiving, by the eligibility determination module, eligibility inputs based on the eligibility requirements of the application; determining, by an evidence determination module, evidentiary requirements for the application based on the type of credential; facilitating, by the evidence determination module, access to the evidentiary requirements; receiving, by the evidence determination module, evidentiary inputs based on the evidentiary requirements of the application; determining, by an evaluation module, whether the application is ready for appraisal based on the eligibility inputs and the evidentiary inputs received; storing, at a storage module, one or more of the eligibility requirements, the evidentiary requirements, the eligibility inputs received, or the evidentiary inputs received; when the application is ready for appraisal, providing, by an appraisal module, the first type of credential to the candidate based on at least a first appraisal of the eligibility inputs and evidentiary inputs received and a second appraisal of the eligibility inputs and evidentiary inputs received.

According to an aspect of the invention, there is provided a system for assembling and analyzing a candidate application to determine a type of credential in a professional credentialing area. The system may comprise a computing device comprising one or more processors configured to register, at a database, a plurality of users and store information related to the plurality of users in the database, identify a user as a candidate, receive, from the candidate, an application registration for a first type of credential in a first professional credentialing area, facilitate access, for the candidate, to an application comprising one or more eligibility requirements based on the first type of credential and one or more evidentiary requirements based on the first type of credential, receive, from the candidate, one or more eligibility inputs for the application, the one or more eligibility inputs corresponding to the one or more eligibility requirements, receive one or more evidentiary inputs for the application, the one or more evidentiary inputs corresponding to the one or more evidentiary requirements, determine, based on the one or more eligibility inputs and the one or more evidentiary inputs, whether the application is ready for appraisal, when the application is ready for appraisal, facilitate access, for at least a first appraiser and a second appraiser, to the one or more eligibility requirements, the one or more evidentiary requirements, the one or more eligibility inputs and the one or more evidentiary inputs for the candidate, receive, from the first appraiser and the second appraiser, at least a first appraisal and a second appraisal, and based on the first appraisal and the second appraisal, provide the first type of credential to the candidate.

According to an aspect of the invention, there is provided a method for assembling and analyzing a candidate application to determine a type of credential in a professional credentialing area. The method may be implemented in a computer system comprising one or more processors configured to execute computer program modules. The method may comprise registering, at a database, a plurality of users and storing information related to the plurality of users in the database; identifying a user as a candidate; receiving, from the candidate, an application registration for a first type of credential; facilitating access, for the candidate, to one or more eligibility requirements based on the first type of credential and one or more evidentiary requirements based on the first type of credential; receiving, from the candidate, one or more eligibility inputs for the application, the one or more eligibility inputs corresponding to the one or more eligibility requirements; receiving one or more evidentiary inputs for the application, the one or more evidentiary inputs corresponding to the one or more evidentiary requirements; determining, based on the one or more eligibility inputs and the one or more evidentiary inputs, whether the application is ready for appraisal; when the application is ready for appraisal, facilitating access, for at least a first appraiser and a second appraiser, to the one or more eligibility requirements, the one or more evidentiary requirements, the one or more eligibility inputs, and the one or more evidentiary inputs for the candidate; receiving, from the first appraiser and the second appraiser, at least a first appraisal and a second appraisal; and based on the first appraisal and the second appraisal, providing the first type of credential to the candidate.

According to an aspect of the invention, there is provided a system for assembling and analyzing a candidate application to determine a type of credential in a professional credentialing area for the candidate. The system may comprise a computing device including a plurality of modules, including, for example, an application generation module and an application evaluation module. The application generation module may be configured to facilitate the generation of an application for a type of credential. The application evaluation module may be configured to determine whether to provide a type of credential to a candidate based on the candidate's application for the type of credential. The application generation module may include a plurality of modules, including, for example, a registration module, a role-based permissions module, an application registration module, an eligibility determination module, an evidence determination module, an evaluation module, a storage module, and/or other modules. In some implementations, the application evaluation module may include a plurality of modules, including, for example, an evaluation module, an appraisal module, a valuation module, a storage module, and/or other modules. In some implementations, one or more of the eligibility determination module, evidence determination module, evaluation module, valuation module, storage module, and/or other modules, and/or portions thereof, may be part of the application generation module and/or the application evaluation module. In some implementations, the application evaluation module and/or portions thereof may reside in a separate computing device.

The registration module may be configured to allow a user to register with the system. The role-based permission module may be configured to tailor a user's access to an application in the system based on their role in the application process. The application registration module may be configured to present various types of credentials to a candidate and allow the candidate to begin an application to receive one or more credentials. The eligibility determination module may be configured to determine eligibility requirements for an application and receive eligibility input therefor. The evidence determination module may be configured to determine evidentiary requirements for an application and receive evidentiary input therefor. The evaluation module may be configured to determine whether inputs have been received for the one or more eligibility requirements and the one or more evidentiary requirements associated with the type of credential requested. The appraisal module may provide a credential to a candidate based on the appraisals received from a first appraiser and a second appraiser. The storage module may be configured to store system information. The validation module may be configured to statistically validate evaluation criteria, application reviews, appraisals, and/or other information related to the system.

As mentioned above, the registration module may be configured to allow a user to register with the system. The registration module may also be configured to create a profile for a user. In some implementations, the registration module may also allow a registered user to associate other users with the profile. The registration module may also facilitate secure access for and identification of the user. For example, the registration module may facilitate the generation of a username and password by which the system identifies a registered user. In another example, the registration module may facilitate encrypted authentication via which the system may identify a registered user. Other methods of secure access and/or identification may also be used.

In some implementations, a user profile may include information including, for example, profile information for the user, role-based information for the user, a synopsis of user activity, resume information, education information, skills information, training information, and/or other information. The synopsis of user activity may include open and past applications of the user, user's recommendations, user's acceptance or rejection of recommendations, user's invitations to one or more recommenders, user's appraisals, statistics associated with user's appraisal, and/or other user activity.

The role-based permission module may be configured to tailor a user's access to the system based on their role in the system. For example, the role-based permission module may restrict user access to one or more modules, permit user access to one or more modules, and permit limited user access to one or more modules. The system may include a plurality of roles, including, for example, an administrator, a candidate, a recommender, an appraiser, and/or other roles. A candidate may be able to access different modules or data from the storage module than, for example, a recommender or an appraiser. For example, an appraiser may be allowed to access the evaluation module while a candidate may not have access to that module. In some examples, a candidate and a recommender may be able to access the evidence determination module. In some implementations, a candidate may only be able to access the application generation module, whereas an appraiser may only be able to access the application evaluation module. In some examples, an administrator may be able to access any module and/or any data stored at the storage module.

The application registration module may be configured to present various types of credentials to a candidate and allow the candidate to begin an application to receive one or more credentials. The various types of credentials may be stored in the storage module. In some implementations, the application registration module may allow a candidate to choose a type of credential for which the candidate wants professional credentialing. Based on the credential chosen by the candidate, the application registration module may prepare an application for the candidate. In some implementations, an application includes user information, eligibility requirements, and evidentiary requirements. For example, based on the credential chosen by the candidate, the application registration module may select one or more eligibility requirements and one or more evidentiary requirements associated with the credential to be included in the application. The application registration module may facilitate access, for the candidate, to one or more eligibility requirements and one or more evidentiary requirements associated with the credential.

In some implementations, the application registration module may determine whether the candidate is requesting a new type of credential or a renewal of a credential. When the candidate is requesting a renewal of a credential, the application registration module may provide an application including the candidate's user information. In some implementations, the application registration module may pre-fill a candidate's application with information stored at the storage module for the candidate.

In some implementations, the types of credentials may include, for example, general credentials, general specialty credentials, expertise specialty credentials, and/or other types of credentials. In some implementations, credentials may be stored in the storage module for more than one professional credentialing area. For example, a first set of various types of credentials may be stored for a first professional credentialing area and a second set of various types of credentials may be stored for a second professional credentialing area. In some examples, the first professional credentialing area may be nursing and the second professional credentialing area may be educational facilities. In some examples, the types of credentials may be determined by a professional credentialing entity in the professional credentialing area.

The eligibility determination module may be configured to determine eligibility requirements for an application and receive eligibility input therefor. In some implementations, the eligibility determination module may provide one or more eligibility requirements based on a candidate's choice of credential. In some implementations, the eligibility determination module may also facilitate access, for the candidate, to the one or more eligibility requirements. In some implementations, the eligibility determination module may also accept input, from the candidate, in response to the one or more eligibility requirements.

The evidence determination module may be configured to determine evidentiary requirements for an application and receive evidentiary input therefor. In some implementations, the evidence determination module may provide one or more evidentiary requirements based on a candidate's choice of credential. In some implementations, the evidence determination module may also facilitate access, for the candidate and/or one or more recommenders invited by the candidate, to the one or more evidentiary requirements. In some implementations, the evidence determination module may also accept input, from the candidate and/or one or more recommenders invited by the candidate, in response to the one or more evidentiary requirements.

The evaluation module may be configured to determine whether inputs have been received for the one or more eligibility requirements and the one or more evidentiary requirements associated with the type of credential requested. For example, the evaluation module may determine whether the candidate has not provided input in response to one of the one or more eligibility requirements or one of the one or more evidentiary requirements. The evaluation module may also indicate, based on the input, whether the candidate's application is ready for appraisal.

In some implementations, the evaluation module may provide an application score relating to the candidate's application. For example, the evaluation module may provide an individual score relating to one of the one or more eligibility requirements. The evaluation module may also provide an individual score relating to one of the one or more evidentiary requirements. The application score may be calculated based on scores related to the one or more eligibility requirements and the one or more evidentiary requirements. The individual and total scores for a candidate may be stored in the storage and associated with the candidate's application.

The appraisal module may provide a credential to a candidate based on the appraisals received from a first appraiser and a second appraiser. The appraisal module may facilitate access, for at least a first appraiser and a second appraiser, to the candidate's application. The first appraiser and the second appraiser may be chosen by the appraisal module. For example, the first appraiser and second appraiser may be chosen randomly or may be chosen based on one or more attributes. The appraisal module may receive, from the first appraiser and the second appraiser, a first appraisal and a second appraisal of the candidate's application. In some implementations, an appraisal may include one or more of an indication regarding approval of the candidate's application and an appraisal score. The appraisal score may be a single score relating to the candidate's application as a whole. In another example, the appraisal score may be calculated by adding individual appraisal scores related to the one or more eligibility requirements and the one or more evidentiary requirements. The first appraisal and second appraisal, along with individual and total appraisal scores for a candidate application, may be stored in the storage and associated with the candidate's application.

Based on the first appraisal and the second appraisal, the appraisal module may provide the type of credential requested to the candidate. When the appraisal module determines that the candidate may not receive the requested credential, the appraisal module may notify the candidate.

The storage module may be configured to store system information. The storage module may be configured to store system information including, for example, user information, candidate information, credential information, professional credentialing area information, valuation statistics, and/or any other information that is communicated at the system.

The validation module that may be configured to statistically validate eligibility and evidentiary requirements, application reviews, appraisals and/or other information stored at the storage module. The validation module may also prepare and facilitate access to reports related to an application, a candidate, a professional credentialing area, and/or other information stored at the storage module. For example, the validation module may access data stored at the storage module and perform statistical analysis on that data. In some implementations, the validation module may statistically validate the application scores from one or more candidates. In some implementations, the validation module may statistically validate an individual score for a specific eligibility or evidentiary requirement across one or more candidates. In some implementations, the validation module may statistically validate the appraisal scores from one or more candidates. In some implementations, the validation module may statistically validate an individual appraisal score for a specific eligibility or evidentiary requirement across one or more candidates. The validation module may also calculate consistency across appraisers. The validation module may also calculate consistency of scores across one or more requirements.

In some implementations, the system may be associated with a professional credentialing entity. For example, the system may be associated with a health care professional credentialing entity. In another example, the system may be associated with an engineering professional credentialing entity.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
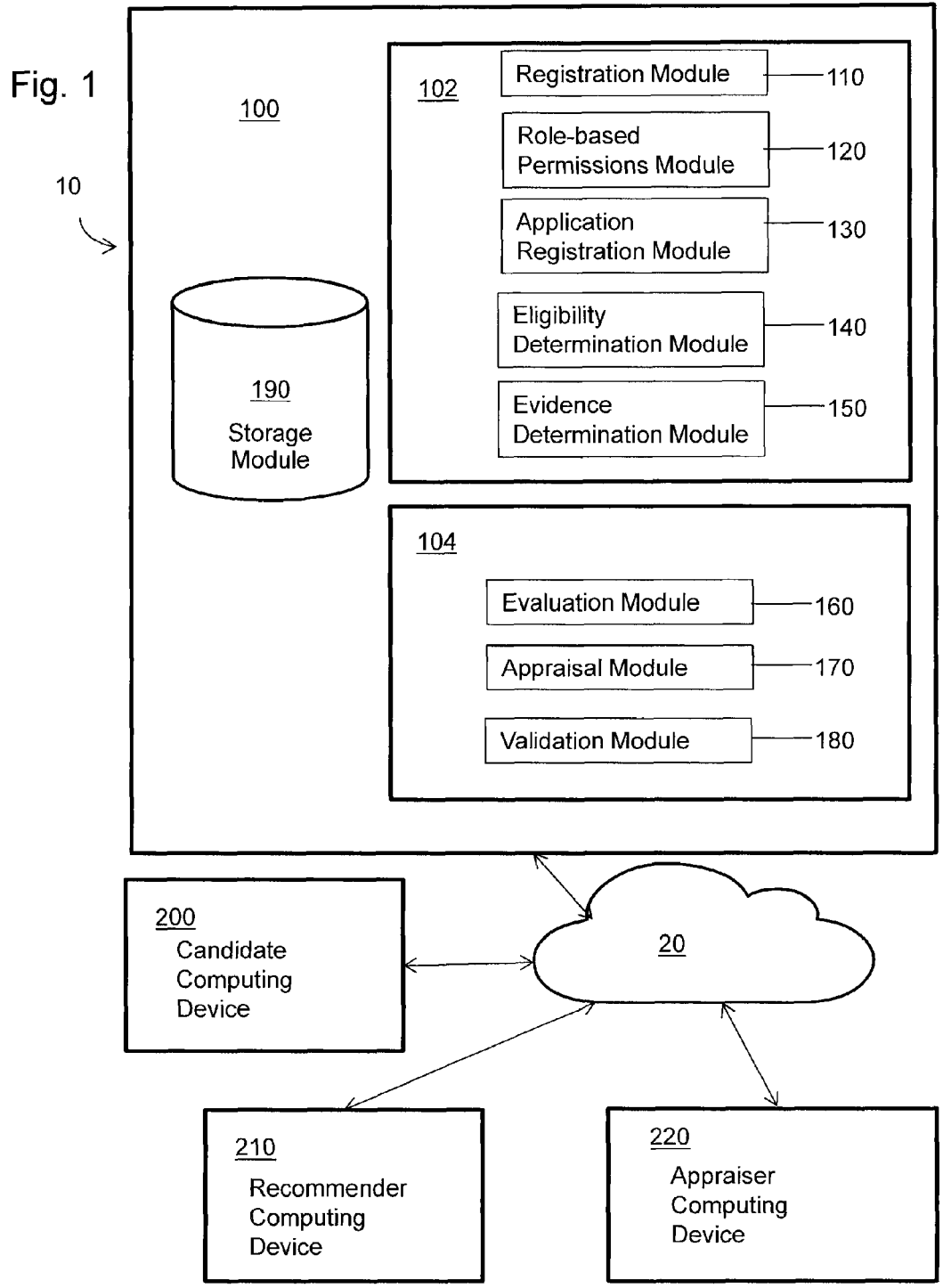
FIG. 1 illustrates a block diagram of an exemplary system for assembling and analyzing a candidate application to determine a type of credential in a professional credentialing area for the candidate, according to an implementation of the invention.

FIG. 1 illustrates a diagram of a system 10 for assembling and analyzing a candidate application to determine a type of credential in a professional credentialing area for the candidate, according to an implementation of the invention. The system 10 may include a network 20, a computing device 100, a candidate computing device 200, a recommender computing device 210, and an appraiser computing device 220. A candidate may use the system 10 to request and/or obtain a type of credential related to a professional credentialing area. For example, a candidate may submit an application for the type of credential. The system 10 may facilitate the receipt of application materials from various sources and may enable review and appraisal of the application by multiple parties. The system 10 may tailor the content of the application to one or more specific types of requested credentials. In some implementations, the system 10 may be associated with one or more professional credentialing areas. For example, the system 10 may be associated with a professional credentialing area such as nursing or education.

Figure 2:
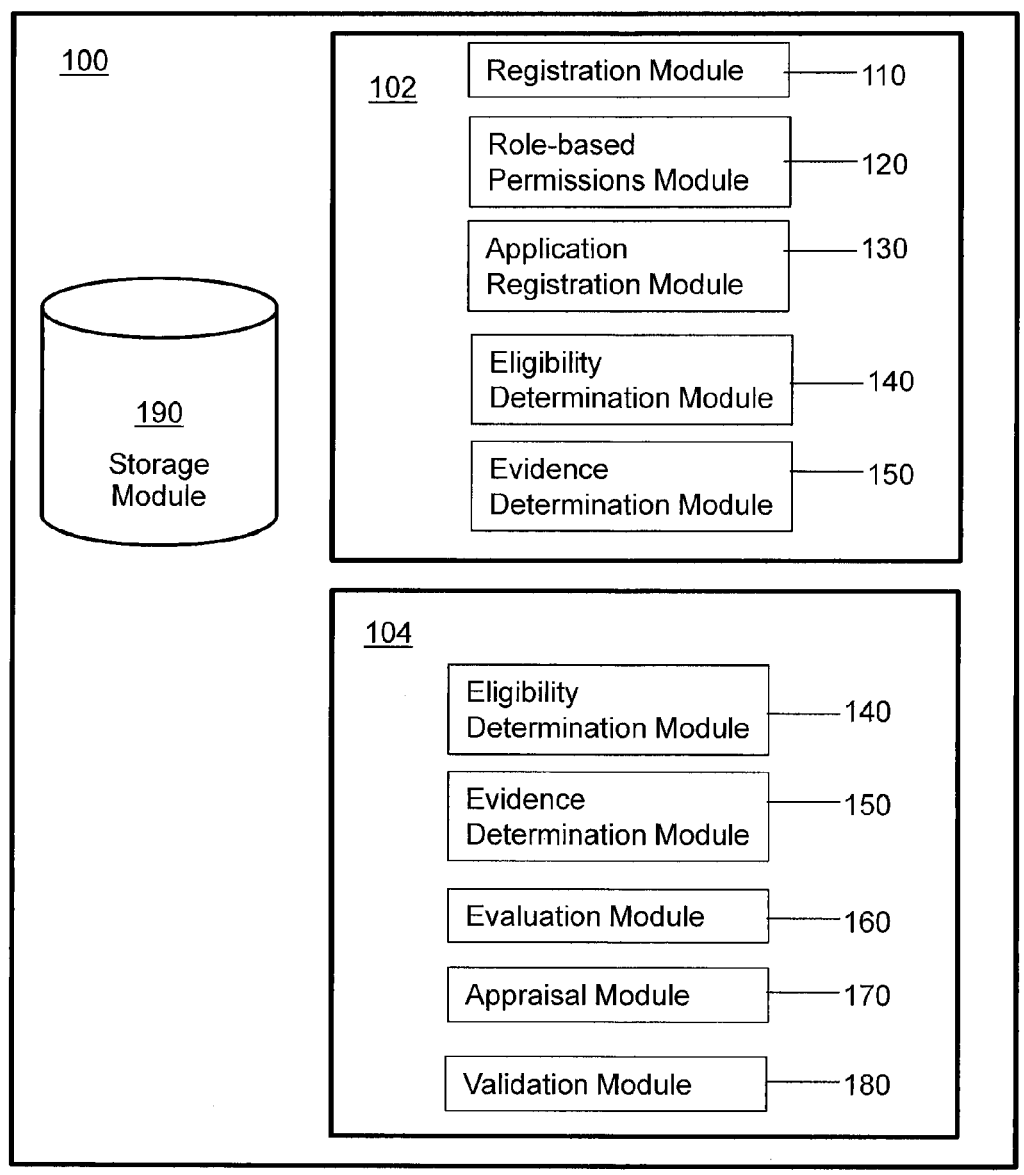
FIG. 2 illustrates a block diagram of an exemplary computing device for assembling and analyzing a candidate application to determine a type of credential in a professional credentialing area for the candidate, according to an implementation of the invention.

As shown in FIG. 1, the system 10 may include a plurality of modules, including, for example, an application generation module 102 and an application evaluation module 104. The application generation module 102 may be configured to facilitate the generation of an application for a type of credential. The application evaluation module 104 may be configured to determine whether to provide a credential to a candidate based on the candidate's application for the type of credential. The application generation module 102 may include a plurality of modules, including, for example, a registration module 110, a role-based permissions module 120, an application registration module 130, an eligibility determination module 140, an evidence determination module 150, and/or other modules. In some implementations, the application evaluation module 104 may include a plurality of modules, including, for example, an evaluation module 160, an appraisal module 170, a validation module 180, and/or other modules. As shown in FIG. 2, in some implementations, the application evaluation module 104 may include a plurality of modules, including, for example, an eligibility determination module 140, an evidence determination module 150, an evaluation module 160, an appraisal module 170, a validation module 180, and/or other modules. The application generation module 102 and the application evaluation module 104 may be communicably coupled to the storage module 190. In some implementations, one or more of the eligibility determination module 140, evidence determination module 150, evaluation module 160, validation module 180, and/or other modules, and/or portions thereof, may be part of the application generation module 102 and/or the application evaluation module 104. In some implementations, the application evaluation module and/or portions thereof may reside in separate computing devices.

The registration module 110 may be configured to allow a user to register with the system. The role-based permission module 120 may be configured to tailor a user's access to an application in the system based on their role in the application process. The application registration module 130 may be configured to present various types of credentials to a candidate and allow the candidate to begin an application to receive a credential. The eligibility determination module 140 may be configured to determine eligibility requirements for an application and receive eligibility input therefor. The evidence determination module 150 may be configured to determine evidentiary requirements for an application and receive evidentiary input therefor. The evaluation module 160 may be configured to determine whether inputs have been received for the one or more eligibility requirements and the one or more evidentiary requirements associated with the type of credential requested. The appraisal module 170 may provide a credential to a candidate based on one or more appraisals received from a first appraiser and a second appraiser. The storage module 190 may be configured to store system information. The validation module 180 may be configured to statistically validate evaluation criteria, application reviews, appraisals, and/or other information related to the system. The validation module 180 may also prepare and facilitate access to reports related to an application, a candidate, a professional credentialing area, and/or other information stored at the storage module 190.

As mentioned above, the registration module 110 may be configured to allow a user to register with the system 10. The registration module 110 may also be configured to create a profile for a user. In some implementations, a user profile may include information including, for example, personal information for the user, role-based information for the user, a synopsis of user activity, resume information, education information, skills information, training information, licenses, research activities, recognitions received by the user, credentials received, associated users, and/or other information. The personal information for the user may include, for example, a user's full name, contact information, demographic information, and/or other personal information. The synopsis of user activity may include open and past applications of the user, user's recommendations, user's acceptance or rejection of recommendations, user's invitations to one or more recommenders, user's appraisals, statistics associated with user's evaluation and/or appraisal, and/or other user activity.

In some implementations, the registration module 110 may facilitate the entry of information by one or more methods. For example, some or all information for the user profile may be manually entered at one or more of the computing device 100, the candidate computing device 200, the recommender computing device 210, the appraiser computing device 220, and/or other computing devices. In some examples, data entry methods for some or all information for the user profile may be include, for example, manual entry, importation from another storage (e.g., a database, cloud-based storage, storage on a computing device, etc.), uploading from another storage, uploading from another profile (e.g., a LinkedIn profile, an employment finder profile such as a profile at Monster.com, etc.), a combination of these data entry methods, and/or other data entry methods.

In some implementations, the registration module 110 may also facilitate the association of other users with a user profile. For example, the user may be a candidate requesting a type of credential. The registration module 110 may allow the candidate to associate one or more other users as recommenders. The registration module 110 may also associate one or more other users as appraisers of the candidate's application. The user profile may be stored in storage module 190.

In some implementations, the registration module 110 may also facilitate secure access for and/or identification of the user. For example, the registration module 110 may facilitate the generation of a username and password by which the system 10 identifies a registered user. The username and password for the user may be stored in the storage module 190 and associated with the user. In another example, the registration module 110 may facilitate encrypted authentication via which the system 10 may identify a registered user. Other methods of secure access and/or identification may also be used.

The role-based permission module 120 may be configured to tailor a user's access to the system 10 based on their role in the system 10. For example, the role-based permission module 120 may restrict user access to one or more modules, permit user access to one or more modules, and permit limited user access to one or more modules. The system 10 may include a plurality of roles, including, for example, an administrator, a candidate, a recommender, an appraiser, and/or other roles. For example, a candidate may be able to access different modules and/or data from the storage module 190 than a recommender or an appraiser. For example, an appraiser may be allowed to access the evaluation module 160 while a candidate may not have access to that module. In some examples, a candidate and a recommender may be able to access the evidence determination module 150. In some implementations, a candidate may only be able to access the application generation module, whereas an appraiser may only be able to access the application evaluation module. In some examples, an administrator may be able to access any module and/or any data stored at the storage module 190.

The application registration module 130 may be configured to present various types of credentials to a candidate and allow the candidate to begin an application to request a credential. The various types of credentials may be stored in the storage module 190. In some implementations, the application registration module 130 may allow a candidate to choose one or more of a level of credential and a type of credential at that level for which the candidate wants professional credentialing. Based on the credential(s) chosen by the candidate, the application registration module 130 may prepare an application for the candidate. In some implementations, an application includes user information, eligibility requirements, and evidentiary requirements. For example, based on a credential chosen by the candidate, the application registration module 130 may select one or more eligibility requirements and one or more evidentiary requirements associated with the credential to be included in the application. The application registration module 130 may facilitate access, for the candidate, to one or more eligibility requirements and one or more evidentiary requirements associated with the credential.

In some implementations, the application registration module 130 may determine whether a candidate meets one or more threshold requirements before allowing the candidate to request a credential. For example, the application registration module 130 may require the candidate to provide one or more pre-screening inputs related to the one or more threshold requirements. The application registration module 130 may receive the one or more pre-screening inputs from the candidate. The one or more prescreening inputs may be stored at the storage module 190 and associated with the candidate. The application registration module 130 may analyze the one or more pre-screening inputs to determine whether the candidate has met the one or more threshold requirements. In some implementations, the threshold requirements may include one or more of: a state license, a certain level of education, a certain level of job experience, a certain level of continuing education or professional development, payment of one or more fees (e.g., an application fee, a professional credentialing entity fee, and/or other fees), and/or other threshold requirements.

In some implementations, the application registration module 130 may determine whether the candidate is requesting a new credential or a renewal of a previously received credential. When the candidate is requesting a renewal of a credential, the application registration module 130 may provide an application including the candidate's user information. For example, the application may include any information stored in the storage module 190 and associated with the candidate. In some implementations, the application may be pre-filled with the candidate's information, including, for example, the candidate's personal information, the candidate's education, eligibility input and evidentiary input relating to respective eligibility and evidentiary requirements for the credential, and/or other candidate information.

In some implementations, the types of credentials may include, for example, general credentials, general specialty credentials, expertise specialty credentials, and/or other types of credentials. In some implementations, one or more credentials may be stored in the storage module 190 for more than one professional credentialing area. For example, a first set of various types of credentials may be stored for a first professional credentialing area and a second set of various types of credentials may be stored for a second professional credentialing area. Professional credentialing areas may include, for example, health care, nursing, engineering, education, college admissions, law bars, and/or other areas.

In some implementations, a professional credentialing area may be nursing. In some implementations, types of general credentials for nursing may include credentials relating to, for example, acute care, adult care, adult gerontology acute care, adult gerontology primary care, adult psychiatric/mental health care, diabetes management, family care, family psychiatric/mental health care, gerontological care, pediatric care, school care, and/or other credentials. Types of general specialty credentials for nursing may include credentials relating to, for example, adult gerontology clinical nurse specialist ("CNS") care, adult health CNS care, adult psychiatric/mental health CNS care, core health care, advanced diabetes management, gerontological CNS care, home health CNS care, pediatric CNS care, public/community health CNS care, and/or other credentials. Types of expertise specialty credentials for nursing may include credentials relating to, for example, ambulatory care, cardiac rehabilitation, cardiac vascular care, certified vascular care, college health care, community health care, advanced diabetes management, general nursing, gerontological care, high-risk perinatal care, home health care, informatics, medical/surgical care, executive nursing, advanced executive nursing, nursing case management, nursing professional development, pain management, pediatric care, perinatal care, psychiatric/mental health care, public health nursing, school nursing, and/or other credentials. In some examples, the types of credentials may be determined by a professional credentialing entity in the professional credentialing area.

In some implementations, the types of credentials available for a professional credentialing area may be stored at storage module 190. The evidentiary and eligibility requirements for a type of credential may also be stored at storage module 190 in association with the respective type of credential. In some implementations, application registration module 130 may access the evidentiary and eligibility requirements stored at storage module 190 in association with a credential requested by a candidate when creating an application for the candidate.

In some implementations, one or more general eligibility requirements and one or more general evidentiary requirements may be required for each level and/or each type of credential for a professional credentialing area. In these implementations, the general eligibility requirements and general evidentiary requirements may be stored in storage module 190 and associated with the professional credentialing area for each level of credential or for all credentials associated with the professional credentialing area. In these implementations, only the eligibility requirements and evidentiary requirements unique to a specific level and/or a specific type of credential may be stored in storage module 190 and associated with that respective level and/or type of credential. In these implementations, application registration module 130 may access the general eligibility requirements and general eligibility requirements for a professional credentialing area and/or for a level of credential as well as the eligibility requirements and evidentiary requirements specific to the type of credential requested when creating an application for a candidate.

In some implementations, general eligibility requirements may include, for example, a college degree, a state license in the professional credentialing area, a lack of criminal convictions associated with the candidate, a lack of disciplinary action against the candidate, and/or other general eligibility requirements. General evidentiary requirements may include, for example, one or more resumes of the candidate, one or more school transcripts of the candidate, one or more letters of recommendation, a self-evaluation of the candidate, a peer evaluation of the candidate, and/or other evidentiary requirements. Specific eligibility requirements (e.g., eligibility requirements unique to a specific type of credential) may include, for example, an amount of time working in the professional credentialing area or in association with the type of credential, research done regarding the professional credentialing area or type of credential, recognitions gained, positions obtained, and/or other specific eligibility requirements. Specific evidentiary requirements (e.g. evidentiary requirements unique to a specific type of credential) may include, for example, time cards and/or affidavits relating to hours worked in the professional credentialing area or with the type of credential, recommendations from persons and/or entities in the professional credentialing area or associated with the type of credential, publications, a summary of the candidate's experience or contribution to the professional credentialing area or type of credential, proof of professional development, proof of continuing education efforts, and/or other specific evidentiary requirements.

The eligibility determination module 140 may be configured to determine eligibility requirements for an application for a type of credential. The eligibility determination module 140 may also be configured to receive eligibility input for the determined eligibility requirements. In some implementations, the eligibility determination module 140 may provide one or more eligibility requirements based on a candidate's choice of credential. In some implementations, the eligibility determination module 140 may also facilitate access, for the candidate, to the one or more eligibility requirements. For example, the eligibility determination module 140 may facilitate access to a description of the one or more eligibility requirements and/or potential acceptable inputs for the respective one or more eligibility requirements. In some implementations, the eligibility determination module 140 may also accept input, from the candidate, in response to the one or more eligibility requirements. The eligibility determination module 140 may store input from the candidate in response to one or more eligibility requirements in storage module 190. An input may be stored in association with the eligibility requirement for which it was submitted. Inputs (and/or eligibility requirements) may be associated with a candidate's application in storage module 190.

The evidence determination module 150 may be configured to determine evidentiary requirements for an application. In some implementations, the evidence determination module 150 may provide one or more evidentiary requirements based on a candidate's choice of credential. In some implementations, the evidence determination module 150 may also facilitate access, for the candidate, to the one or more evidentiary requirements. For example, the evidence determination module 150 may facilitate access to a description of the one or more evidentiary requirements and/or potential acceptable inputs for the respective one or more evidentiary requirements.

In some implementations, the evidence determination module 150 may also accept input in response to the one or more evidentiary requirements. In some implementations, the candidate may provide evidentiary input via the evidence determination module 150. In some implementations, the candidate may facilitate access to an evidentiary requirement to another user (e.g., a recommender and/or other associated user). For example, the candidate may facilitate access to an evidentiary requirement of a recommendation for the candidate to one or more recommenders. In another example, the candidate may facilitate access to an evidentiary requirement of a peer evaluation to one or more associated users.

In some implementations, the evidence determination module 150 may enable a candidate to facilitate access to an evidentiary requirement by sending a notification to the recommender (or associated user) with instructions on how to provide input for the requirement. For example, the notification may be an email with a link to a website at which the recommender or associated user may upload evidentiary input. For example, the evidentiary input may be uploaded via an FTP site, via an upload link at a website, by scanning and saving the input to a cloud-based directory, and/or by other electronic methods of uploading input. In another example, the notification may be a letter sent to the recommender or associated user. In some implementations, the recommender or associated user may provide paper copies of evidentiary input. Other types of notifications and other formats of input may be used.

In some implementations, the recommender or associated user may facilitate access, for the candidate, of the provided input. In some instances, the candidate may reject the provided input. In some instances, when the candidate rejects the provided input, the evidence determination module 150 may notify the recommender or associated user whose input was rejected. In some instances, when the candidate rejects provided input, the evidence determination module 150 may be configured to allow the candidate to invite another recommender or associated user to provide evidence relating to the evidentiary requirement.

In some implementations, the evidence determination module 150 may store input in response to one or more evidentiary requirements for the candidate in storage module 190. An input may be stored in association with the evidentiary requirement for which it was submitted. Inputs (and/or evidentiary requirements) may be associated with a candidate's application in storage module 190.

The evaluation module 160 may be configured to determine whether inputs have been received for the one or more eligibility requirements and the one or more evidentiary requirements associated with the type of credential requested. The evaluation module 160 may determine whether inputs have been stored in storage module 190 in association with the eligibility requirements and with the evidentiary requirements for the type of credential requested for the candidate. For example, the evaluation module 160 may determine whether the candidate has not provided input in response to one of the one or more eligibility requirements or one of the one or more evidentiary requirements.

In some implementations, the evaluation module 160 may indicate, based on the inputs received for the candidate's application, whether the candidate's application is ready for appraisal. For example, the application may be ready for appraisal when the evaluation module 160 determines that input has been stored in association with all of the eligibility and evidentiary requirements associated with the type of credential requested by the candidate. In another example, the application may be ready for appraisal when the evaluation module 160 determines that a majority of inputs have been stored in association with all of the eligibility and evidentiary requirements associated with the type of credential requested by the candidate. In some examples, the application may be ready for appraisal when the evaluation module 160 determines that specific inputs have been stored in storage module 190 in association with specific ones of the eligibility and evidentiary requirements associated with the type of credential requested by the candidate. In some implementations, one or more of the eligibility requirements and/or one or more of the evidentiary requirements may be mandatory and one or more of the eligibility requirements and/or one or more of the evidentiary requirements may be optional. In these implementations, the application may be ready for appraisal when the evaluation module 160 determines that inputs have been stored in storage module 190 in association with all of the eligibility and evidentiary requirements associated with the type of credential requested by the candidate that are mandatory.

In some implementations, the evaluation module 160 may provide an application score relating to the candidate's application. In some implementations, for one or more requirements (e.g., an eligibility requirement and/or an evidentiary requirement), the evaluation module 160 may store in the storage module 190 a range of values for one or more attributes related to the requirement as well as a score associated with each range of values. For example, for a candidate's college grade point average (e.g., from an evidentiary input of the candidate's college transcript), the evaluation module 160 may store one or more associated scores with the candidate's grade point average. A first score may be associated with a first range (e.g., 3.5-4.0), a second score may be associated with a second range (e.g., 3.0-3.49), and so forth. In some implementations, the evaluation module 160 may provide an individual score relating to one of the one or more eligibility requirements. The evaluation module 160 may also provide an individual score relating to one of the one or more evidentiary requirements. The application score may be calculated by adding the scores related to the one or more eligibility requirements and the one or more evidentiary requirements. The individual and total scores for a candidate may be stored in the storage module 190 and associated with the candidate's application.

The appraisal module 170 may provide a credential to a candidate based on the appraisals received from a first appraiser and a second appraiser. The appraisal module 170 may facilitate access, for a first appraiser and a second appraiser, to the candidate's application. The first appraiser and the second appraiser may be chosen by the appraisal module 170. For example, the first appraiser and second appraiser may be chosen randomly or may be chosen based on one or more attributes. The appraisal module 170 may receive, from the first appraiser and the second appraiser, a first appraisal and a second appraisal of the candidate's application, respectively. In some implementations, a first appraisal may include one or more of an indication regarding approval of the candidate's application and an appraisal score. The appraisal score may be a single score relating to the candidate's application as a whole. In another example, the appraisal score may be calculated by adding individual appraisal scores related to the one or more eligibility requirements and the one or more evidentiary requirements. The first appraisal and second appraisal, along with individual and total appraisal scores for a candidate application, may be stored in the storage module 190 and associated with the candidate's application.

Based on the first appraisal and the second appraisal, the appraisal module 170 may provide the requested credential to the candidate. When the appraisal module 170 determines that the candidate may not receive the requested credential, the appraisal module may notify the candidate. In some implementations, the appraisal module 170 may determine that the candidate may receive the requested credential when both the first appraisal and the second appraisal indicate that the candidate should receive the credential. In some implementations, the appraisal module 170 may determine that the candidate may receive the requested credential when a total appraisal score associated with the candidate's application passes a threshold score associated with the credential. For example, the storage module 190 may store, for one or more types of credentials, a threshold appraisal score. In some implementations, the appraisal module 170 may determine that the candidate may receive the requested credential based on a combination of threshold score and indications from one or more of the first and second appraisal.

When the first appraisal and the second appraisal comprise conflicting indications, the appraisal module 170 may notify the first appraiser and the second appraiser of the conflict. In some implementations, the first appraiser and second appraiser may submit a revised respective first appraisal and second appraisal. In some implementations, a third appraiser may provide a third appraisal that comprises a "tie-breaking" indication regarding whether the candidate should receive the requested credential. In some implementations, the appraisal scores may then be used as a factor to determine whether the candidate should receive the requested credential. In some implementations, a third appraiser and a fourth appraiser may provide a respective third appraisal and fourth appraisal of the application that are used to determine whether the candidate receives the requested credential.

The storage module 190 may be configured to store system information. The storage module 190 may be configured to store system information including, for example, user information, candidate information, credential information, professional credentialing area information, validation statistics, and/or any other information that is communicated at the system.

The validation module 180 may be configured to statistically validate eligibility and evidentiary requirements, application reviews and appraisals. The validation module 180 may also prepare and facilitate access to reports related to an application, a candidate, a professional credentialing area, and/or other data stored at the storage module 190. For example, the validation module may access data stored at the storage module 190 and perform statistical analysis on that data. In some implementations, the validation module 180 may statistically validate the application scores from one or more candidates. In some implementations, the validation module 180 may statistically validate an individual score for a specific eligibility or evidentiary requirement across one or more candidates. In some implementations, the validation module 180 may statistically validate the appraisal scores from one or more candidates. In some implementations, the validation module 180 may statistically validate an individual appraisal score for a specific eligibility or evidentiary requirement across one or more candidates. The validation module 180 may calculate consistency across appraisers based on stored appraisal scores. The validation module 180 may statistically validate a type of score by calculating a consistency of scores of that type across one or more users and/or one or more applications. In some implementations, the validation module 180 may statistically validate data across, for example, a specific credential, a level of credentials, a professional credentialing area, and/or other category.

As shown in FIG. 1, the system 10 may also include a candidate computing device 200. In some implementations, the candidate computing device 200 may comprise one or more processors and storage and may be in communication with computing system 100. The candidate computing device 200 may be configured to facilitate an application, by a candidate, for a credential.

As shown in FIG. 1, the system 10 may also include a recommender computing device 210. In some implementations, the recommender computing device 210 may comprise one or more processors and storage and may be in communication with computing system 100. The recommender computing device 210 may be configured to facilitate providing, by a recommender, a recommendation for a candidate.

As shown in FIG. 1, the system 10 may also include an appraiser computing device 220. In some implementations, the appraiser computing device 220 may comprise one or more processors and storage and may be in communication with computing system 100. The appraiser computing device 220 may be configured to facilitate providing, by an appraiser, an appraisal of a candidate application.

Figure 3:
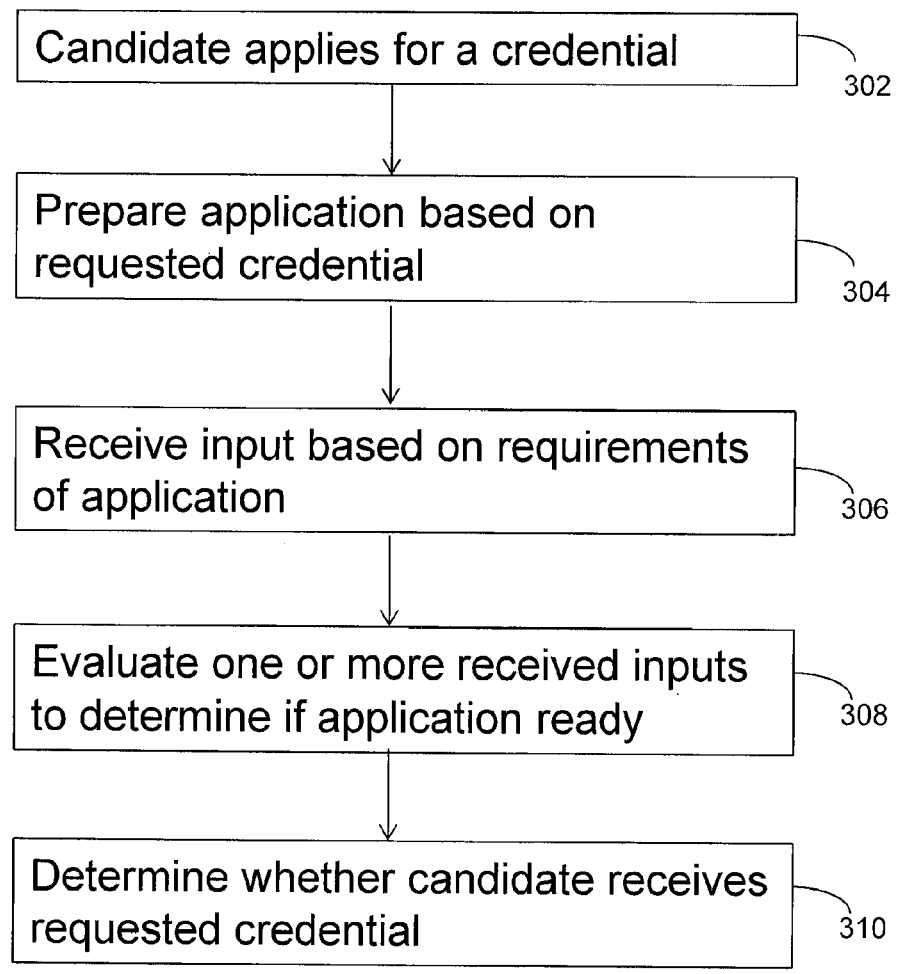
FIG. 3 illustrates a flowchart of an exemplary process of assembling and analyzing a candidate application to determine a type of credential in a professional credentialing area for the candidate, according to an implementation of the invention.

FIG. 3 illustrates a process for assembling and analyzing a candidate application to determine a type of credential in a professional credentialing area for the candidate according to various implementations of the invention. The described operations of FIG. 3 and other figures may be accomplished using some or all of the system components described in detail above and, in some implementations, various operations may be performed in different sequences. In other implementations, additional operations may be performed along with some or all of the operations shown in FIG. 3 and the other figures. In yet other implementations, one or more operations may be performed simultaneously. In yet other implementations, one or more combinations of various operations may be performed. Some implementations may not perform all of the operations described with relation to FIG. 3 and other figures. Accordingly, the operations described are exemplary in nature and, as such, should not be viewed as limiting.

In an operation 302, a candidate may apply for a credential via the system 10. In some implementations, the candidate may be registered with the system 10 and profile information for the candidate may already be stored, for example, at the storage module 190. In other implementations, the candidate may register with the system 10 and provide profile information to be stored at the system 10. In the application for a credential, the candidate may specify a type of credential requested. In some implementations, the candidate may specify one or more of an area of professional credentialing, a level of credential, and a type of credential.

Figure 4A:
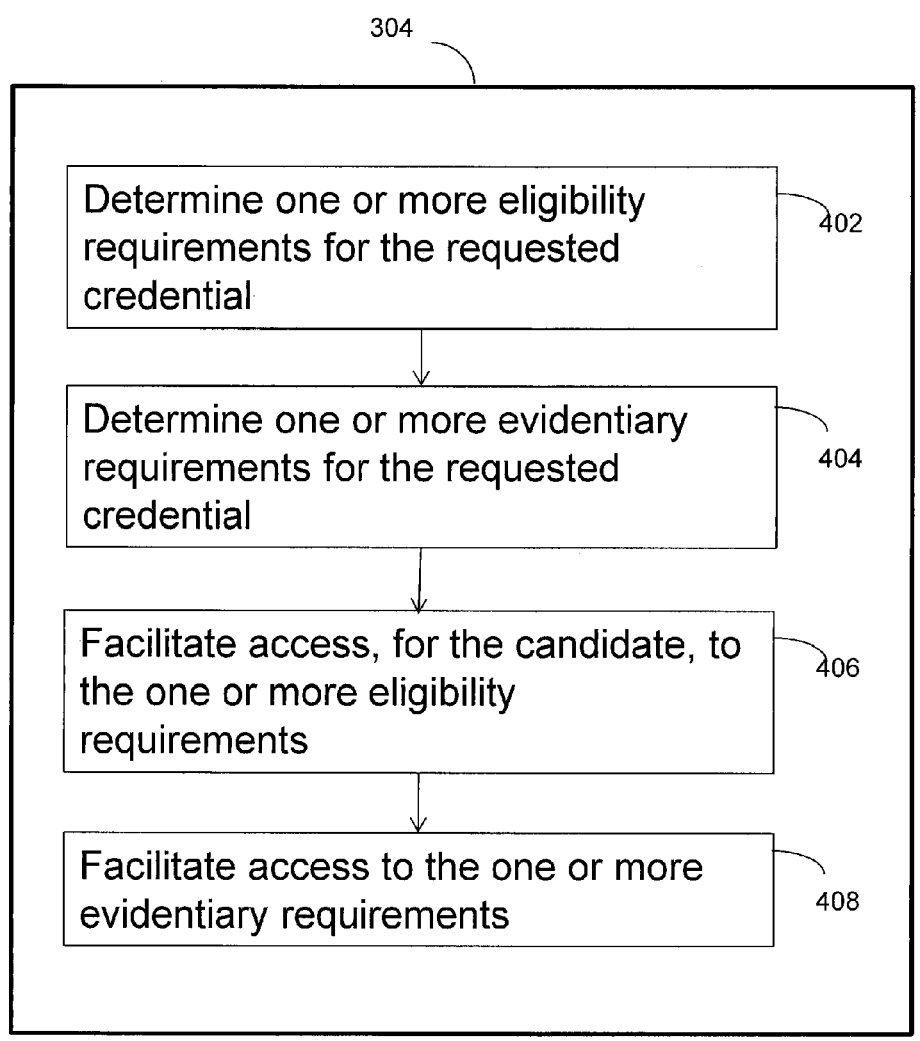
FIG. 4A illustrates a flowchart depicting an exemplary operation for preparing a candidate application, according to an implementation of the invention.

In an operation 304, the system 10 (including, for example, the application registration module 130, the evaluation determination module 140, and/or the evidence determination module 150), may prepare an application for the candidate based on the requested credential. In some implementations, the system 10 (via, for example, storage module 190), may store one or more eligibility requirements and one or more evidentiary requirements for a type of credential. For example, as illustrated in FIG. 4A, the eligibility determination module 140 may determine one or more eligibility requirements associated with the requested credential in an operation 402. In an operation 404, the evidence determination module 150 may determine one or more evidentiary requirements associated with the requested credential. Thus, the application may include the eligibility and evidentiary requirements associated with the credential. The application may also include any eligibility or evidentiary requirements that are associated with a level of credential and/or a professional credentialing area specified by the candidate. The application may also include general requirements including, for example, user information, for any candidate that requests a credential. In an operation 406, the system 10 may facilitate access, for the candidate, to the eligibility requirements of the application. In an operation 408, the system 10 may facilitate access, for the candidate and for any users invited by and/or associated with the candidate, to the one or more eligibility requirements. As mentioned above, the evidence determination module 150 may enable a candidate to facilitate access, for any users invited by and/or associated with the candidate, to an evidentiary requirement by sending a notification to the invited user with instructions on how to provide input for the requirement. For example, the notification may be an email with a link to a website at which the invited user may upload evidentiary input. For example, the evidentiary input may be uploaded via an FTP site, via an upload link at a website, by scanning and saving the input to a cloud-based directory, and/or by other electronic methods of uploading input. In another example, the notification may be a letter sent to the invited user. In some implementations, the invited user may provide paper copies of evidentiary input. Other types of notifications and other formats of input may be used.

Figure 4B:
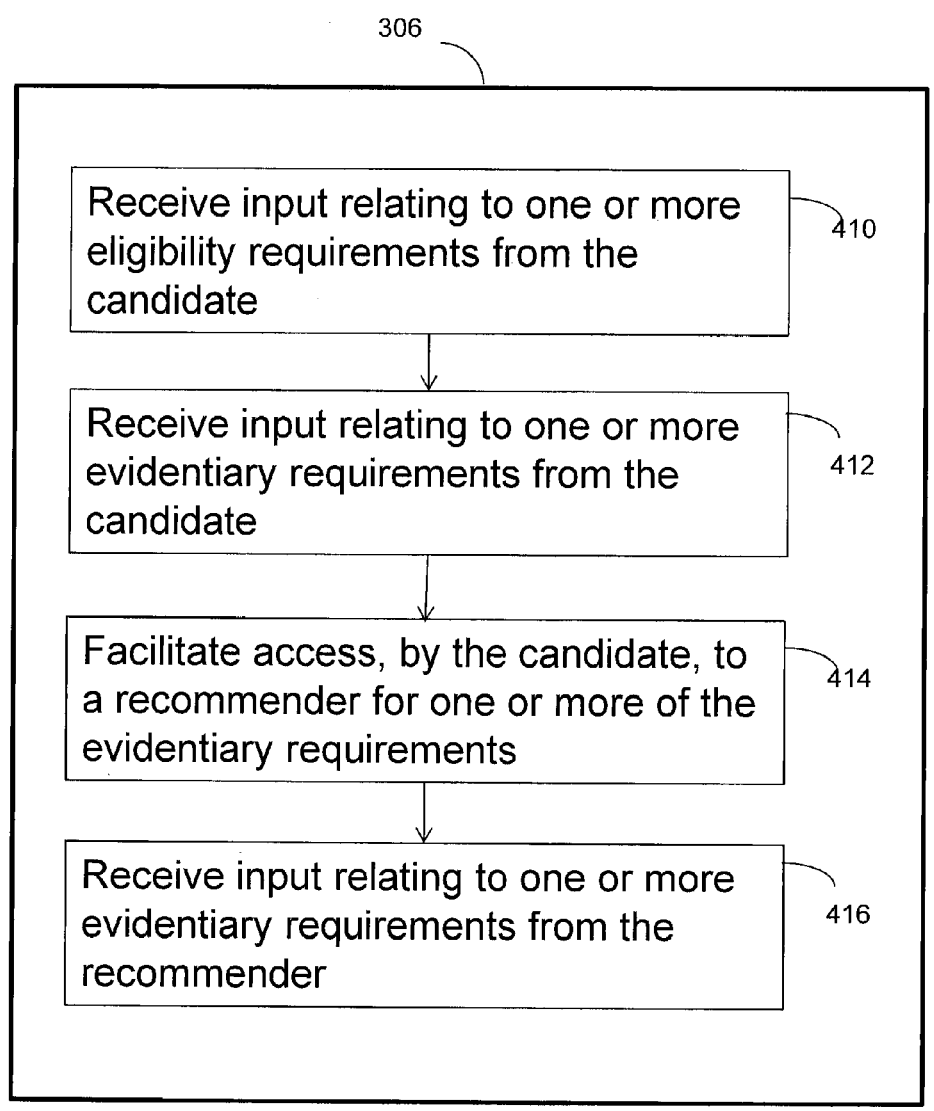
FIG. 4B illustrates a flowchart depicting an exemplary operation for preparing a candidate application, according to an implementation of the invention.

Returning to FIG. 3, in an operation 306, the system 10 (including, for example, the eligibility determination module 140 and the evidence determination module 150) may receive input based on the application requirements. For example, as illustrated in FIG. 4B, the eligibility determination module 140 may receive one or more inputs based on the one or more eligibility requirements associated with the type of credential requested in an operation 410. In an operation 412, the evidence determination module 150 may receive one or more inputs based on the one or more evidentiary requirements associated with the requested credential.

In an operation 414, the evidence determination module 150 may enable a candidate to facilitate access, for a recommender that the candidate invites to the system 10, to one or more evidentiary requirements. In an operation 416, the system 10 may receive input relating to the one or more evidentiary requirements from the recommender. In some implementations, the recommender may facilitate access, for the candidate, to the provided input. In some instances, the candidate may reject the provided input. In some instances, when the candidate rejects the provided input, the evidence determination module 150 may notify the recommender whose input was rejected. In some instances, when the candidate rejects provided input, the evidence determination module 150 may be configured to allow the candidate to invite another recommender to provide evidence relating to the evidentiary requirement.

Figure 4C:
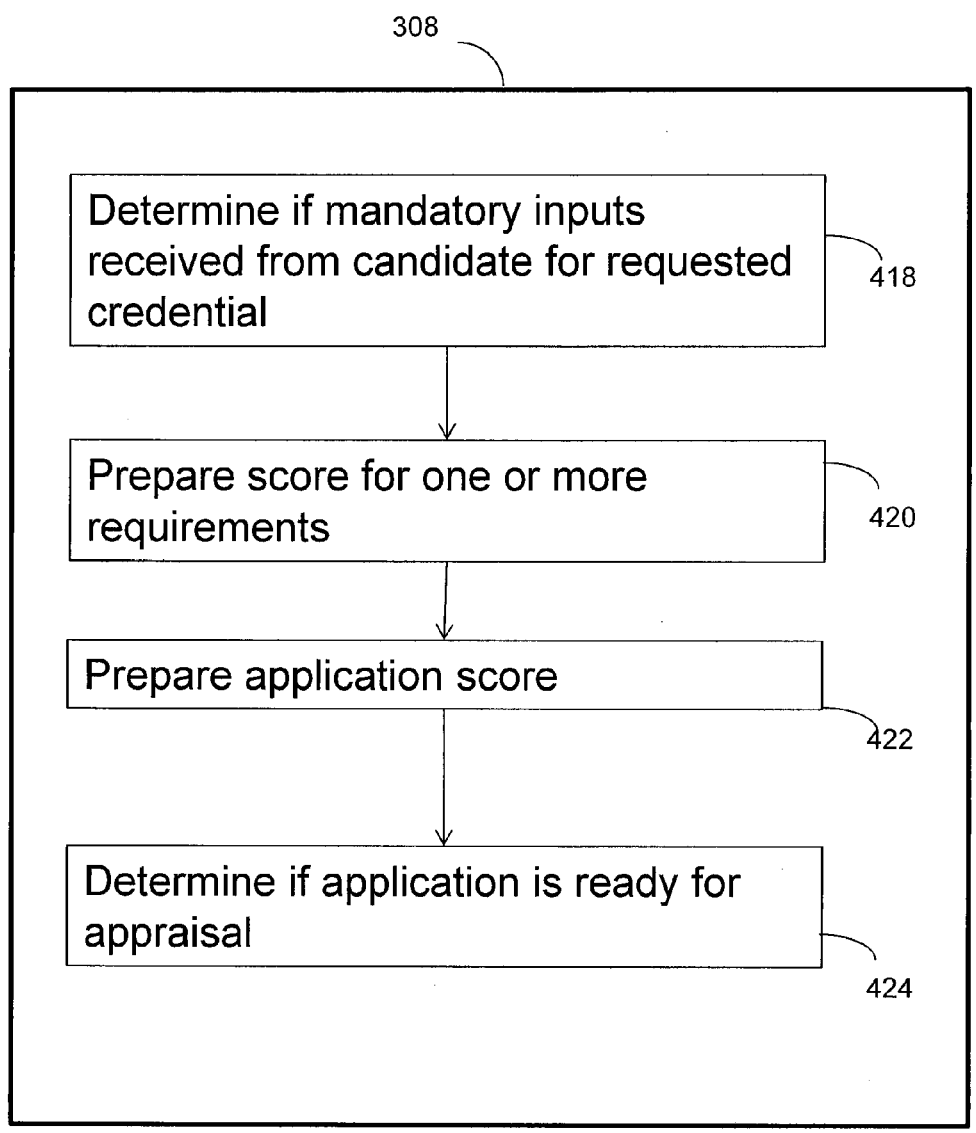
FIG. 4C illustrates a flowchart depicting an exemplary operation for preparing a candidate application, according to an implementation of the invention.

Returning to FIG. 3, in operation 308, the system 10 (including, for example, the eligibility determination module 140, the evidence determination module 150, and/or the evaluation module 160) may evaluate the received inputs to determine whether the application is ready for appraisal. For example, as illustrated in FIG. 4C, the evaluation module 160 may determine whether inputs were received for one or more eligibility requirements and one or more evidentiary requirements that were mandatory requirements for the requested credential in an operation 418.

In some implementations, in an operation 420, the evaluation module 160 may prepare a score for one or more of the eligibility requirements and/or evidentiary requirements. In some implementations, the evaluation module 160 may prepare a score for only mandatory requirements. In some implementations, the evaluation module 160 may prepare a score for some or all of the requirements for which input was received. In some implementations, the evaluation module 160 may prepare a score for those requirements for which a score calculation was provided. For example, for one or more requirements, the storage module 190 may store a score range and associated scores for evaluating an input received in response to a requirement. For those scores which have associated score ranges, the evaluation module 160 may prepare a score.

In an operation 422, the evaluation module 160 may prepare a total score for the application. The application score may be a sum of one or more scores prepared for the one or more requirements. In some implementations, the application score may be a sum of all of the scores prepared for the requirements. In some implementations, the application score may weight scores for mandatory and for optional requirements differently. In some implementations, the application score may include weights for scores related to one or more requirements. The method by which the application score is prepared is not limited to the examples described herein.

In an operation 424, the system 10 (including, for example, evaluation module 160) may determine whether the application is ready for appraisal. In some implementations, the system 10 may determine whether the application is ready for appraisal based on whether the mandatory requirements of the application have received input therefor. In some implementations, the system 10 may also determine whether the application is ready for appraisal based on an application score prepared by the evaluation module 160. In some implementations, a combination of the received inputs and the application score may be used. Other methods may also be used to determine whether the application is ready for appraisal. In some implementations, the candidate may also have to certify that they have met the requirements for the requested credential before the application may be considered ready for appraisal.

Returning to FIG. 3, in operation 310, the system 10 (including, for example, the appraisal module 170 and/or the evaluation module 160) may determine whether the candidate should receive the requested credential based on the application. In some implementations, the appraisal module 170 may facilitate access, for a first appraiser and a second appraiser, to the candidate's application. The first appraiser and the second appraiser may be chosen by the appraisal module 170. For example, the first appraiser and second appraiser may be chosen randomly or may be chosen based on one or more attributes. The appraisal module 170 may receive, from the first appraiser and the second appraiser, a first appraisal and a second appraisal of the candidate's application, respectively.

In some implementations, a first appraisal may include one or more of an indication regarding approval of the candidate's application and an appraisal score. The appraisal score may be a single score relating to the candidate's application as a whole. In another example, the appraisal score may be calculated by adding individual appraisal scores related to the one or more eligibility requirements and the one or more evidentiary requirements. In some implementations, the requirements for which appraisal scores are determined may be similar or the same as those requirements for which application scores were prepared. In some implementations, the requirements for which appraisal scores are determined may include one or more requirements different than those requirements for which application scores were prepared.

The first appraisal and second appraisal, along with individual and total appraisal scores for a candidate application, may be stored in the storage and associated with the candidate's application. Similar to the scores prepared by the evaluation module 160 for the one or more requirements of the application, the appraisal module 170 may prepare appraisal scores for the application.

Figure 4D:
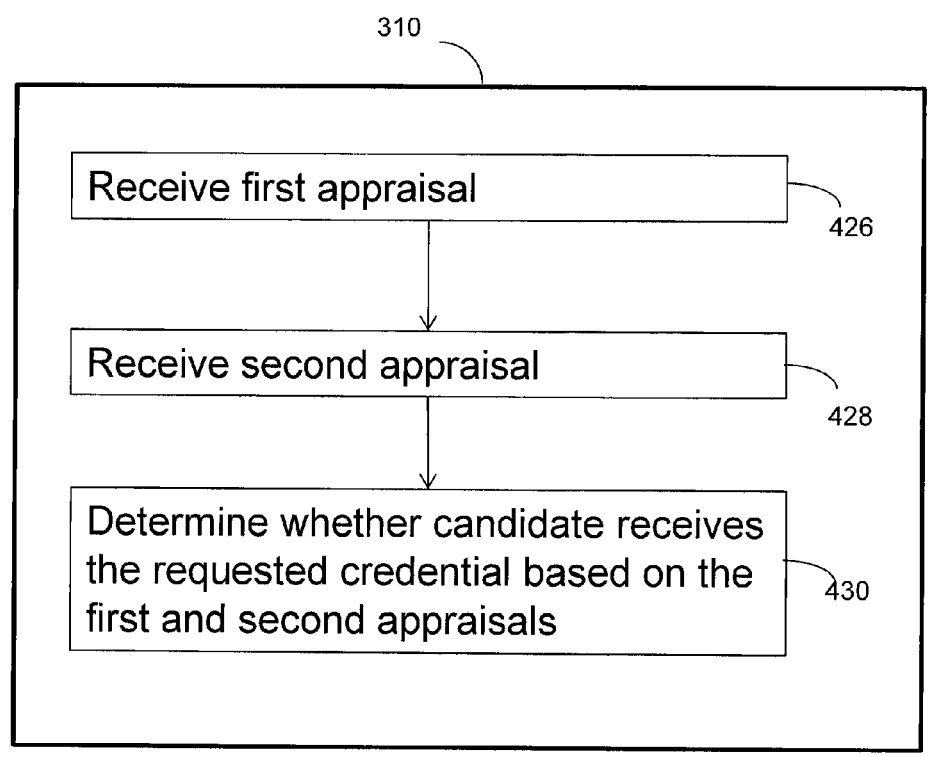
FIG. 4D illustrates a flowchart depicting an exemplary operation for preparing a candidate application, according to an implementation of the invention.

In some implementations, as illustrated in FIG. 4D, the appraisal module 170 may receive a first appraisal from the first appraiser in an operation 426. In an operation 428, the appraisal module 170 may receive a second appraisal from the second appraiser. In an operation 430, the appraisal module 170 may determine whether the candidate receives the requested credential.

In some implementations, the appraisal module 170 may determine whether the candidate receives the requested credential based on the first appraisal and the second appraisal. When the first appraisal and the second appraisal comprise conflicting indications, the appraisal module 170 may notify the first appraiser and the second appraiser of the conflict. In some implementations, the first appraiser and second appraiser may submit a revised respective first appraisal and second appraisal. In some implementations, a third appraiser may provide a third appraisal that comprises a "tie-breaking" indication regarding whether the candidate should receive the requested credential. In some implementations, the appraisal scores may then be used as a factor to determine whether the candidate should receive the requested credential. In some implementations, a third appraiser and a fourth appraiser may provide a respective third appraisal and fourth appraisal of the application that are used to determine whether the candidate receives the requested credential.

In some implementations, the appraisal module 170 may determine whether the candidate receives the requested credential based on one or more of the first appraisal indication, the first appraisal score, the second appraisal indication, and the second appraisal score. In some implementations, when the first appraisal score or the second appraisal score does not meet a threshold score required for credential, the appraisal module 170 may determine that the candidate should not receive the requested credential. When the first appraisal score and the second appraisal score meet or exceed the threshold score, the appraisal module 170 may then determine whether the candidate receives the requested credential based on the first appraisal and the second appraisal in a manner similar to that discussed above.

Figure 5:
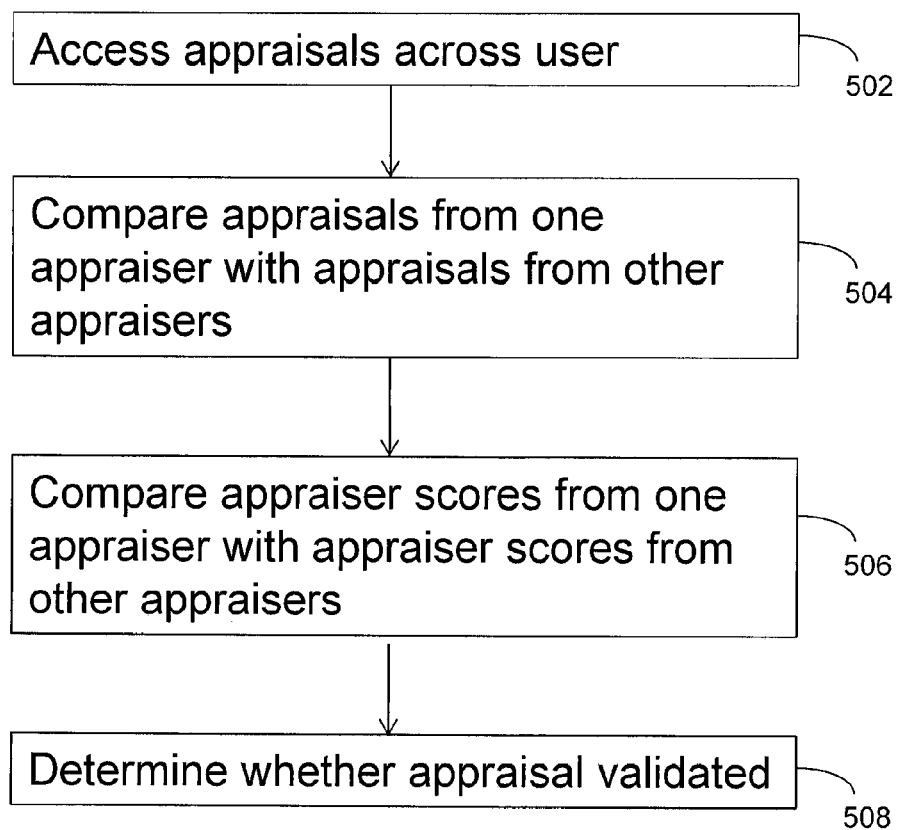
FIG. 5 illustrates a flowchart of an exemplary method of validating an appraiser, according to an implementation of the invention.

FIG. 5 illustrates a process for validating an appraisal from an appraiser of an application according to various implementations of the invention. For example, the system 10 (including, for example, the validation module 180) may statistically validate the performance of an appraiser in light of the performance of other appraisers of the system 10. In an operation 502, the validation module 180 may access appraisal data stored at the storage module 190. For example, the validation module 180 may access one or more (or all) of the appraisals and appraisal scores associated with a first appraiser. In an operation 504, the validation module 180 may compare the appraisals associated with the first appraiser with appraisals associated with other appraisers. In an operation 506, the validation module 180 may compare the appraisal scores associated with the first appraiser with appraisal scores associated with other appraisers. In an operation 508, the validation module 180 may statistically validate the performance of an appraiser based on the comparison of the appraiser's appraisals and/or appraisal scores.

In some implementations, the validation module 180 may be configured to statistically validate appraisals and appraisal scores as illustrated in FIG. 5. For example, the validation module 180 may statistically validate the appraisals from one or more candidates. In some implementations, the validation module 180 may statistically validate an indication included in an appraisal across one or more candidates. The validation module 180 may calculate consistency across appraisers based on stored appraisals. In some implementations, the validation module 180 may determine a percentage of a first appraiser's appraisals that were favorable (or unfavorable) to a candidate and compare that percentage with other appraisers. In some implementations, the validation module 180 may determine an average percentage of all favorable appraisals stored at the system. The validation module 180 may also determine whether the first appraiser's percentage falls within one or two standard deviations of the average. When the first appraiser's percentage does not fall within two standard deviations of the average percentage, the first appraiser's appraisals may not be validated. Other measures (such as threshold percentage, a different number of standard deviations, etc.) may be used as well.

In some implementations, the validation module 180 may statistically validate an individual appraisal score for a specific eligibility or evidentiary requirement across one or more candidates. The validation module 180 may calculate consistency across appraisers based on stored appraisal scores. In some implementations, the validation module 180 may calculate and compare the consistency of appraisal scores in a manner similar to the calculation and comparison of appraisals. The validation module 180 may calculate and compare a total appraisal score for the application in a same or similar manner.

In some implementations, the validation module 180 may be configured to statistically validate eligibility and evidentiary requirements, application reviews and other data of the system 10 in a similar manner. The validation module 180 may statistically validate a type of score by calculating a consistency of scores of that type across one or more users and/or one or more applications. The validation module 180 may also prepare and facilitate access to reports related to an application, a candidate, a credential, a professional credentialing area, and/or other information stored at the storage module 190.

Figure 6:
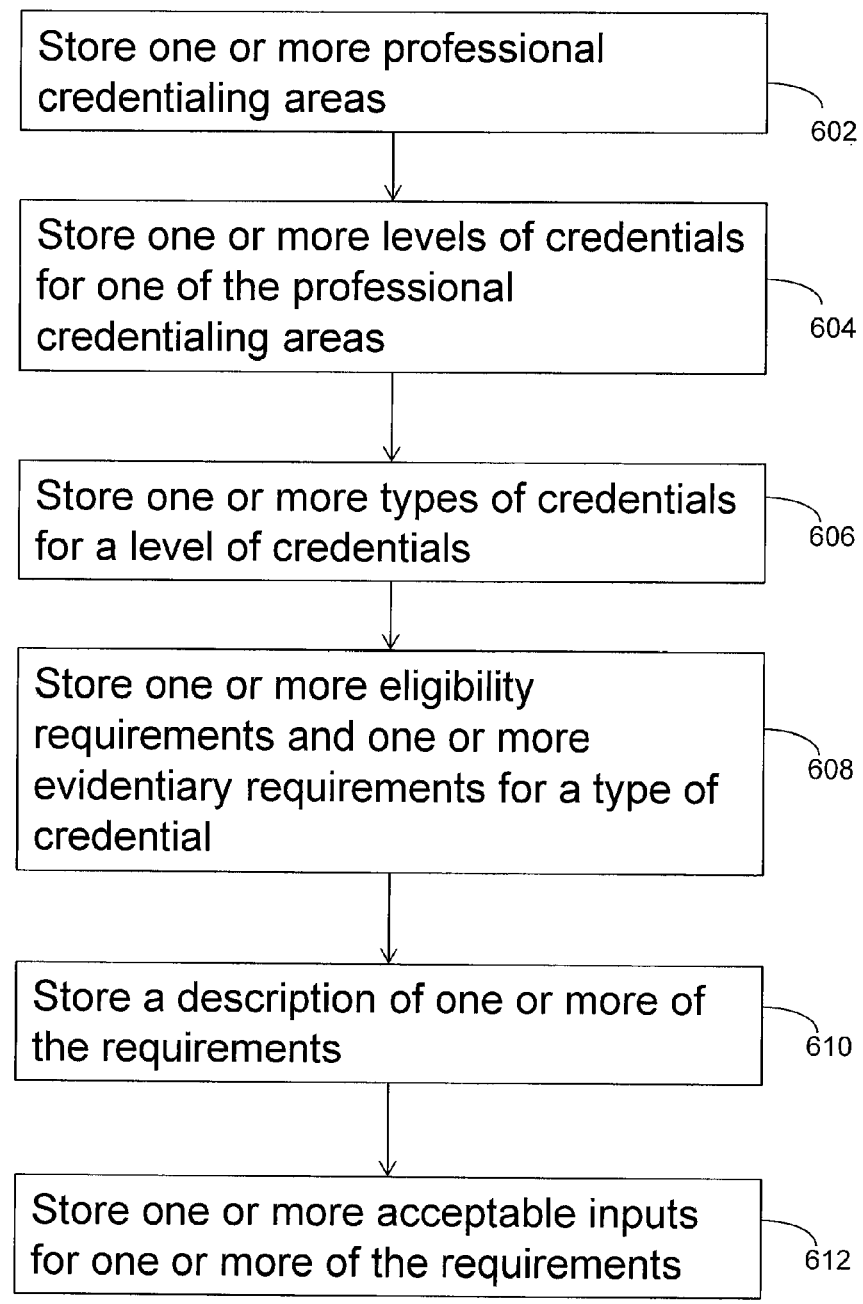
FIG. 6 illustrates a flowchart of an exemplary method of facilitating a process of assembling and analyzing a candidate application to determine a type of credential in a professional credentialing area for the candidate, according to an implementation of the invention.

FIG. 6 illustrates a process for facilitating the assembling and analyzing a candidate application to determine a type of credential in a professional credentialing area for the candidate according to various implementations of the invention. For example, the system 10 may facilitate processes by which an application for a candidate may be prepared. In an operation 602, the system 10 may store information relating to one or more professional credentialing areas at the storage module 190. In an operation 604, the system 10 may store information relating to one or more levels of credentials for a professional credentialing area stored at the storage module 190. In an operation 606, the system 10 may store one or more types of credentials relating to one or more levels of credentials stored at the storage module 190. In some implementations, the system 10 may store one or more types of credentials relating to one or more professional credentialing areas at the storage module 190. In some of these implementations, the professional credentialing areas may not include multiple levels of credentials. In an operation 608, the system 10 may store one or more eligibility requirements and one or more evidentiary requirements relating to one or more types of credentials stored at the storage module 190. In an operation 610, the system 10 may store a description of one or more of the eligibility requirements and/or one or more of the evidentiary requirements at the storage module 190. In some implementations, one or more of the eligibility requirements and/or one or more of the evidentiary requirements may be general requirements associated with a candidate application. In some implementations, one or more of the eligibility requirements and/or one or more of the evidentiary requirements may be associated with a professional credentialing area. In some implementations, one or more of the eligibility requirements and/or one or more of the evidentiary requirements may be associated with a level of credential in a professional credentialing area. In some implementations, one or more of the eligibility requirements and/or one or more of the evidentiary requirements may be associated with a specific type of credential. When preparing a candidate application, the system 10 may determine the eligibility and evidentiary requirements based on one or more of the professional credentialing area, level of credential, and specific type of credential. The system 10 may also include any general requirements for all candidates when preparing the candidate application.

In an operation 612, the system 10 may store one or more acceptable inputs for one or more of the eligibility requirements and/or one or more of the evidentiary requirements at the storage module 190. For example, for an input for one of the requirements, the system 10 may store one or more input features including, for example, a type of acceptable input, data format(s) of an acceptable input, a size of the acceptable input, a number of attributes of an acceptable input, a number of inputs for a requirement, and/or other input features.

Figure 7:
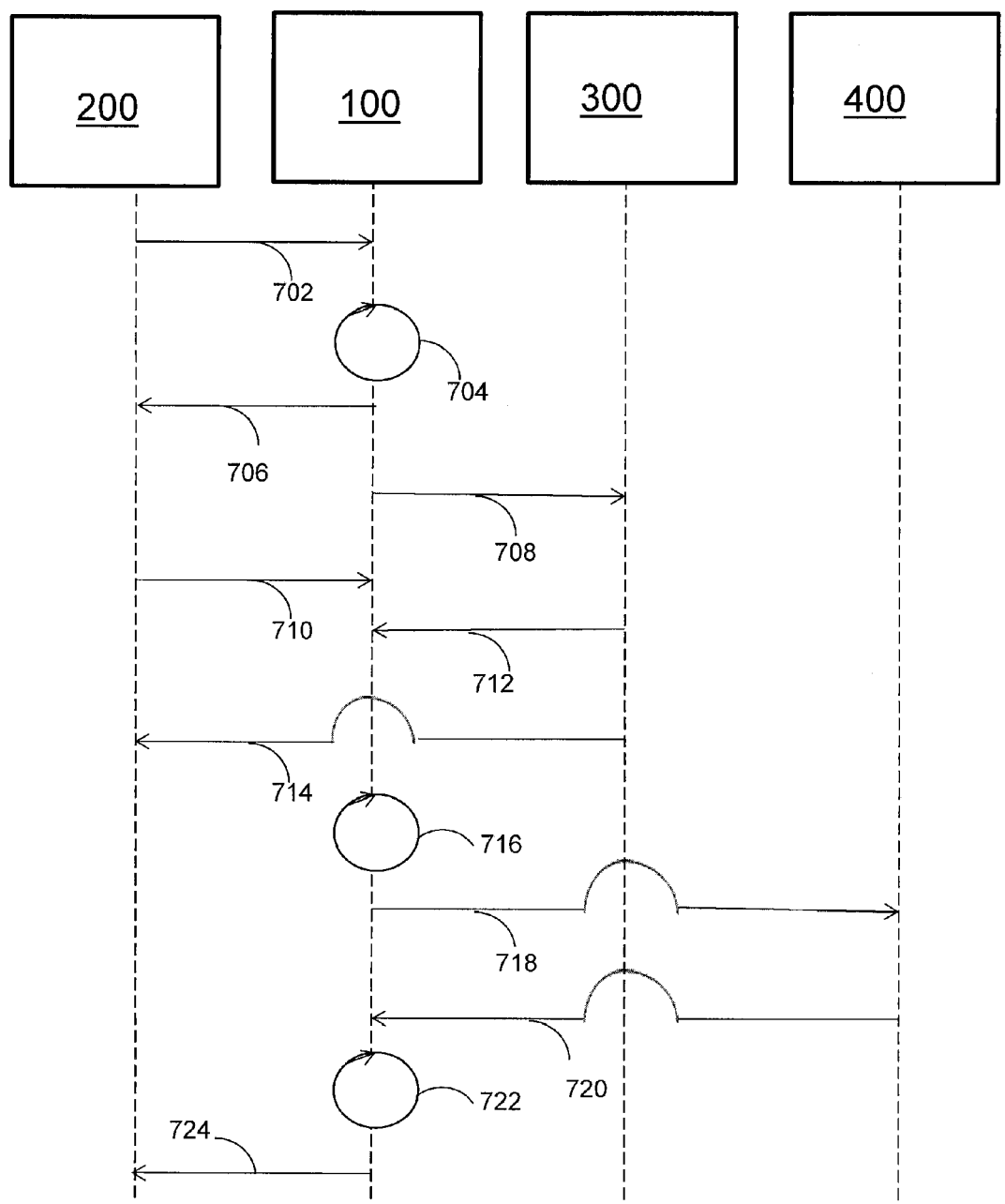
FIG. 7 illustrates a data flow diagram for assembling and analyzing a candidate application to determine a type of credential in a professional credentialing area for the candidate according to various implementations of the invention.

FIG. 7 illustrates a data flow diagram for assembling and analyzing a candidate application to determine a type of credential in a professional credentialing area for the candidate according to various implementations of the invention. FIG. 7 may depict the possibility of a variety of different implementations.

In some implementations, in operation 702, computing device 100 may receive a request for a credential from candidate computing device 200. For example, a user of the candidate computing device 200 may apply for a credential via candidate computing device 200 and computing device 100. In some implementations, the user may apply for the credential using computing device 100.

In an operation 704, the computing device 100 prepares an application for the candidate. For example, the computing device 100 may prepare an application for the candidate based on the credential requested by the candidate.

In operation 706, the computing device 100 may facilitate access, for the candidate, to one or more eligibility requirements and one or more evidentiary requirements of the application. In an operation 708, the computing device 100 may facilitate access, for the recommender computing device 210, to one or more evidentiary requirements of the application.

In an operation 710, the candidate computing device 200 may communicate one or more inputs relating to one or more eligibility and/or evidentiary requirements of the application. In an operation 712, the recommender computing device 210 may facilitate communication, from a recommender to the computing device 100, of one or more inputs to one or more evidentiary requirements of the application. In some implementations, in an operation 714, the recommender computing device 210 may also facilitate communication, from a recommender to the candidate computing device 200, of the one or more inputs to the one or more evidentiary requirements of the application.

In an operation 716, the computing device 100 determines whether the application is ready for appraisal. For example, the computing device 100 may determine whether acceptable inputs have been received for one or more of the eligibility and/or evidentiary requirements of the application, as discussed above.

When the application has been determined to be ready for appraisal, in an operation 718, the computing device 100 may facilitate communication of the application and of any inputs or information associated with the application to one or more appraiser computing devices 220. For example, the computing device 100 may send the application and associated information to a first appraiser device 220 and a second appraiser device, which may be the same as first appraiser device 220 or a different but similar device. In some implementations, the appraisal of the application may be carried out by computing device 100. In some implementations, as in an operation 720, first appraiser device 220 and second appraiser device (and/or respective users thereof) may communicate appraisals relating to the application to the computing device 100.

In operation 722, the computing device 100 may determine, based on one or more of the first appraisal and the second appraisal, whether to provide the requested credential to the user of the candidate computing device 200. This determination may be made in a same or similar manner as described above.

In an operation 724, the computing device 100 may communicate to the candidate computing device 200 whether the user of the candidate computing device 200 has been provided the requested credential.

The computing device 100 may be any computing device such as, for example, a server, a desktop computer, laptop computer, personal digital assistant, smart phone, and/or any other computing device. Other configurations and system architectures may be used. For example, although not shown, computing device 100 may be or include one or more servers connected to one or more clients via a network 20 such as a Wide Area Network, Local Area Network, the Internet, a cloud-based network and/or other network or combination thereof. The computing device 100 may be capable of communicating with network 20, candidate computing device 200, recommender computing device 210, and/or appraiser computing device 220.

The candidate computing device 200 may be any computing device such as, for example, a server, a desktop computer, laptop computer, personal digital assistant, smart phone, and/or any other computing device. The candidate computing device 200 may be capable of communicating with network 20, computing device 100, recommender computing device 210, and/or appraiser computing device 220.

In some implementations, the candidate computing device 200 communicates with one or more other without the use of intermediary user devices or clients (i.e. directly through a network). In some implementations, candidate computing device 200 communicates with computing device 100 via the use of an intermediary. In some implementations, candidate computing device 200 communicates with computing device 100 via the network 20. In some implementations, the candidate computing device 200 is able to communicate with computing device 100 over the Internet and/or without communicating via network 20 or a part of network 20.

The recommender computing device 210 may be any computing device such as, for example, a server, a desktop computer, laptop computer, personal digital assistant, smart phone, and/or any other computing device. The recommender computing device 300 may be capable of communicating with network 20, computing device 100, and/or appraiser computing device 220.

The appraiser computing device 220 may be any computing device such as, for example, a server, a desktop computer, laptop computer, personal digital assistant, smart phone, and/or any other computing device. The appraiser computing device 220 may be capable of communicating with network 20, computing device 100, and/or recommender computing device 210.

The one or more databases comprising the storage module 190 may be, include, or interface to, for example, a relational database, other types of databases, other types of data storage, including file-based, object, or query formats, platforms, and/or other available forms of databases and/or storages that may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the storage module 190 may be part of or hosted by computing device 100. In some implementations, the storage module 190 may be part of or hosted by another computing device on network 20. In some implementations, the storage module 190 may be physically separate from the computing device 100 but may be operably communicable therewith.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computing device for assembling and analyzing a candidate application to determine a type of credential in a professional credentialing area, comprising:

one or more processors configured to execute computer program modules, the computer program modules comprising an application registration module, when executed by the one or more processors, allows the candidate to apply for a first type of credential in a first professional credentialing area;

an eligibility determination module, when executed by the one or more processors, determines eligibility requirements for the application based on the first type of credential, facilitates access, for the candidate, to the eligibility requirements, and receives eligibility inputs based on the eligibility requirements of the application;

an evidence determination module, when executed by the one or more processors, determines evidentiary requirements for the application based on the first type of credential, facilitates access to the evidentiary requirements, and receives evidentiary inputs based on the evidentiary requirements of the application;

an evaluation module, when executed by the one or more processors, determines whether the application is ready for appraisal based on the eligibility inputs and the evidentiary inputs received;

an appraisal module, when executed by the one or more processors, provides, when the application is ready for appraisal, the first type of credential to the candidate based on at least a first appraisal of the eligibility inputs and evidentiary inputs received and a second appraisal of the eligibility inputs and evidentiary inputs received; and a storage module, when executed by the one or more processors, stores one or more of the eligibility requirements, the evidentiary requirements, the eligibility inputs received, or the evidentiary inputs received.

2. The device of claim 1, wherein the storage module, when executed by the one or more processors, stores the first type of credential and a second type of credential, the second type of credential being different than the first type of credential.

3. The device of claim 1, wherein the storage module, when executed by the one or more processors, stores one or more levels of credentials, the one or more levels of credentials associated with one or more respective types of credentials, a first level of credential indicating a different level of expertise than a second level of credential, and wherein the application registration module, when executed by the one or more processors, facilitates access, for the candidate, to the one or more levels of credentials and the one or more respective types of credentials.

4. The device of claim 1, wherein the evidence determination module, when executed by the one or more processors facilitates access, for a recommender invited by the user, to one of the one or more evidentiary requirements.

5. The device of claim 4, wherein the evidence determination module, when executed by the one or more processors, receives from the recommender, one or more inputs relating to the candidate in response to one of the one or more evidentiary requirements.

6. The device of claim 5, wherein the evidence determination module, when executed by the one or more processors, facilitates access, for the candidate, to the one or more inputs of the recommender.

7. The device of claim 1, wherein the appraisal module, when executed by the one or more processors, facilitates access, for the candidate, to the first appraisal and the second appraisal.

8. The device of claim 1, wherein the first appraisal comprises an indication whether the candidate should receive the first type of credential.

9. The device of claim 1, wherein the appraisal module, when executed by the one or more processors, receives the first appraisal from a first appraiser, and receives the second appraisal from a second appraiser.

10. The device of claim 9, wherein the first appraiser is chosen based on one or more of a credential of the first appraiser, appraisal statistics relating to the first appraiser, expertise of the first appraiser, or availability of the first appraiser.

11. The device of claim 9, wherein the first appraiser is chosen randomly from a set of one or more appraisers.

12. The device of claim 1, wherein the evaluation module, when executed by the one or more processors, prepares one or more eligibility input scores based on the eligibility inputs received, prepares one or more evidentiary input scores based on the evidentiary inputs received, and
determines, based on the eligibility input scores and the evidentiary input scores, whether the application is ready for appraisal.

13. The device of claim 1, further comprising a validation module, when executed by the one or more processors, generates statistics based on the first appraisal and the second appraisal.

14. The device of claim 1, further comprising a validation module, when executed by the one or more processors, generates statistical validation of one or more of the one or more eligibility requirements, the one or more evidentiary requirements, the first appraisal, or the second appraisal.

15. A method for assembling and analyzing a candidate application to determine a type of credential in a professional credentialing area, the method being implemented in a computer system comprising one or more processors configured to execute computer program modules, the method comprising:
receiving, from a candidate, an application for a first type of credential in a first professional credentialing area;
determining, by an eligibility determination module, eligibility requirements for the application based on the type of credential;
facilitating, by the eligibility determination module, access, for the candidate, to the eligibility requirements;
receiving, by the eligibility determination module, eligibility inputs based on the eligibility requirements of the application;
determining, by an evidence determination module, evidentiary requirements for the application based on the type of credential;
facilitating, by the evidence determination module, access to the evidentiary requirements;
receiving, by the evidence determination module, evidentiary inputs based on the evidentiary requirements of the application;
determining, by an evaluation module, whether the application is ready for appraisal based on the eligibility inputs and the evidentiary inputs received;
storing, at a storage module, one or more of the eligibility requirements, the evidentiary requirements, the eligibility inputs received, or the evidentiary inputs received; and
when the application is ready for appraisal, providing, by an appraisal module, the first type of credential to the candidate based on at least a first appraisal of the eligibility inputs and evidentiary inputs received and a second appraisal of the eligibility inputs and evidentiary inputs received.

16. The method of claim 15, further comprising:
storing, by the storage module, the first type of credential and a second type of credential, the second type of credential being different than the first type of credential.

17. The method of claim 15, further comprising:
storing, by the storage module, one or more levels of credentials, the one or more levels of credentials associated with one or more respective types of credentials, a first level of credential indicating a different level of expertise than a second level of credential; and
facilitating, by the application registration module, access, for the candidate, to the one or more levels of credentials and the one or more respective types of credentials.

18. The method of claim 15, further comprising:
facilitating, by the evidence determination module, access, for a recommender invited by the user, to one of the evidentiary requirements.

19. The method of claim 18, further comprising:
receiving, by the evidence determination module, one or more inputs from the recommender relating to the candidate in response to one of the evidentiary requirements.

20. The method of claim 19, further comprising:
facilitating, by the evidence determination module, access, for the candidate, to the one or more inputs of the recommender.

21. The method of claim 15, further comprising:
facilitating, by the appraisal module, access, for the candidate, to the first appraisal and the second appraisal.

22. The method of claim 21, wherein the first appraisal comprises an indication whether the candidate should receive the first type of credential.

23. The method of claim 21, further comprising:
receiving, by the appraisal module, the first appraisal from a first appraiser; and
receiving, by the appraisal module, the second appraisal from a second appraiser.

24. The method of claim 21, further comprising:
choosing, by the appraisal module, the first appraiser based on one or more of a credential of the first appraiser, appraisal statistics relating to the first appraiser, expertise of the first appraiser, or availability of the first appraiser.

25. The method of claim 21, further comprising:
choosing, by the appraisal module, the first appraiser randomly from a set of one or more appraisers.

26. The method of claim 15, further comprising:
preparing, by the evaluation module, one or more eligibility input scores based on the eligibility inputs received;
preparing, by the evaluation module, one or more evidentiary input scores based on the evidentiary inputs received;
determining, by the evaluation module, based on the one or more eligibility input scores and the one or more evidentiary input scores, whether the application is ready for appraisal.

27. The method of claim 15, further comprising:
generating, by a validation module, statistics based on the first appraisal and the second appraisal.

28. The method of claim 15, further comprising:
generating, by a validation module, statistical validation of one or more of the one or more eligibility requirements, the one or more evidentiary requirements, the first appraisal, or the second appraisal.

29. A system for assembling and analyzing a candidate application to determine a type of credential in a professional credentialing area, comprising:
a computing device comprising one or more processors configured to
register, at a database, a plurality of users and store information related to the plurality of users in the database,
identify a user as a candidate,
receive, from the candidate, an application registration for a first type of credential in a first professional credentialing area,
facilitate access, for the candidate, to an application comprising one or more eligibility requirements based on the first type of credential and one or more evidentiary requirements based on the first type of credential,
receive, from the candidate, one or more eligibility inputs for the application, the one or more eligibility inputs corresponding to the one or more eligibility requirements,
receive one or more evidentiary inputs for the application, the one or more evidentiary inputs corresponding to the one or more evidentiary requirements,
determine, based on the one or more eligibility inputs and the one or more evidentiary inputs, whether the application is ready for appraisal,
when the application is ready for appraisal, facilitate access, for at least a first appraiser and a second appraiser, to the one or more eligibility requirements, the one or more evidentiary requirements, the one or more eligibility inputs and the one or more evidentiary inputs for the candidate,
receive, from the first appraiser and the second appraiser, at least a first appraisal and a second appraisal, and
based on the first appraisal and the second appraisal, provide the first type of credential to the candidate.

30. The system of claim 29, wherein the one or more processors are further configured to store, at the database, the first type of credential and a second type of credential, the second type of credential being different than the first type of credential.

31. The system of claim 29, wherein the one or more processors are further configured to store, at the database, one or more levels of credentials, the one or more levels of credentials associated with one or more respective types of credentials, a first level of credential indicating a different level of expertise than a second level of credential, and facilitate access, for the candidate, to the one or more levels of credentials and the one or more respective types of credentials.

32. The system of claim 29, wherein the one or more processors are further configured to facilitate access, for a recommender invited by the user, to one of the one or more evidentiary requirements.

33. The system of claim 32, wherein the one or more processors are further configured to receive, from the recommender, one or more inputs relating to the candidate in response to one of the one or more evidentiary requirements.

34. The system of claim 33, wherein the one or more processors are further configured to facilitate access, for the candidate, to the one or more inputs of the recommender.

35. The system of claim 29, wherein the one or more processors are further configured to facilitate access, for the candidate, to the first appraisal and the second appraisal.

36. The system of claim 29, wherein the first appraisal comprises an indication whether the candidate should receive the first type of credential.

37. A method for assembling and analyzing a candidate application to determine a type of credential in a professional credentialing area, the method being implemented in a computer system comprising one or more processors configured to execute computer program modules, the method comprising:
registering, at a database, a plurality of users and storing information related to the plurality of users in the database;
identifying a user as a candidate;
receiving, from the candidate, an application registration for a first type of credential;
facilitating access, for the candidate, to one or more eligibility requirements based on the first type of credential and one or more evidentiary requirements based on the first type of credential;
receiving, from the candidate, one or more eligibility inputs for the application, the one or more eligibility inputs corresponding to the one or more eligibility requirements;
receiving one or more evidentiary inputs for the application, the one or more evidentiary inputs corresponding to the one or more evidentiary requirements;
determining, based on the one or more eligibility inputs and the one or more evidentiary inputs, whether the application is ready for appraisal;
when the application is ready for appraisal, facilitating access, for at least a first appraiser and a second appraiser, to the one or more eligibility requirements, the one or more evidentiary requirements, the one or more eligibility inputs and the one or more evidentiary inputs for the candidate;
receiving, from the first appraiser and the second appraiser, at least a first appraisal and a second appraisal; and
based on the first appraisal and the second appraisal, providing the first type of credential to the candidate.

38. The method of claim 37, further comprising:
storing, at the database, the first type of credential and a second type of credential, the second type of credential being different than the first type of credential.

39. The method of claim 37, further comprising:
storing, at the database, one or more levels of credentials, the one or more levels of credentials associated with one or more respective types of credentials, a first level of credential indicating a different level of expertise than a second level of credential; and
facilitating access, for the candidate, to the one or more levels of credentials and the one or more respective types of credentials.

40. The method of claim 37, further comprising:
facilitating access, for a recommender invited by the user, to one of the one or more evidentiary requirements 41. The method of claim 40, further comprising:
receiving, from the recommender, one or more inputs relating to the candidate in response to one of the one or more evidentiary requirements.

42. The method of claim 41, further comprising:
facilitating access, for the candidate, to the one or more inputs of the recommender.

43. The method of claim 37, further comprising:
facilitating access, for the candidate, to the first appraisal and the second appraisal.

44. The method of claim 37, wherein the first appraisal comprises an indication whether the candidate should receive the first type of credential.

* * * * *